INVENTOR.
George L. Lippold

United States Patent Office 3,126,285
Patented Mar. 24, 1964

3,126,285
METHOD OF DESOLVENTIZING AND TOASTING SOYBEAN MEAL
George L. Lippold, St. Joseph, Mo., assignor to Dannen Mills, Inc., St. Joseph, Mo., a corporation of Missouri
Filed Aug. 31, 1959, Ser. No. 837,221
5 Claims. (Cl. 99—98)

This invention relates to an improved method and apparatus for processing food products and particularly to equipment for more efficiently and effectively desolventizing and treating solvent extracted materials such as soybean flakes or the like.

The oil is removed from products such as soybeans by a process employing a relatively volatile solvent for the particular oil in order to extract the same from the beans or other oil containing material, whereby the solid residue remaining after separation of the oil containing solvent and the solvent insoluble substance, is substantially free of oil but is not suitable for food purposes because of the solvent remaining therein, as well as the unpalatable and even toxic nature of the solids.

It is therefore the primary object of the present invention to provide a process and apparatus for permitting removal of the solvent from materials such as soybean flakes from which the oil has been extracted, utilizing a continuous operation which does not require close operator control and which is designed to remove the solvent and convert the food product to palatable form in a single unit requiring a minimum of moving parts and power per unit quantity of material processed.

It is a further important object of the invention to provide an improved method and apparatus for desolventizing and toasting solvent extracted materials such as soybean flakes wherein the latter are passed successively through a series of chambers in which the solvent is initially removed from the flakes and the latter then toasted in the presence of moisture to make the same palatable and more nutritious, and with the toasting being greatly enhanced by heating the material to a somewhat higher temperature and subjecting the same to a higher pressure in one toasting compartment after removal of the solvent therefrom and just prior to drying of the flakes preparatory to packaging of the same for sale and distribution.

A still further important object of the invention is to provide a novel process and apparatus for desolventizing and toasting solvent extracted materials employing an upright tower having a number of separate, vertically stacked chambers in direct intercommunication, with all but one of the chambers having vapor passages therein to permit the volatilized water or solvent to pass upwardly into the compartment therenext above or to a point of collection and with by-pass means being provided for intercommunicating the compartments on opposed sides of the toasting compartment devoid of a vapor outlet, whereby efficient utilization is made of the vapors while at the same time permitting raising of the temperature of the flakes to a higher point and subjecting the same to a higher pressure within the toasting compartment to improve the palatability and nutritional characteristics of the final product.

An additional important aim of the invention is to provide apparatus as defined above wherein the material is continuously directed successively through the individual compartments of the equipment by virtue of the fact that the bottom wall defining a respective compartment has a discharge opening therein communicating directly with the compartment therenext below and with chute means secured to the underside of a corresponding bottom wall and in direct alignment with the discharge opening terminating in spaced relationship to the proximal wall below the same and thus, serving to maintain the level of material in each compartment substantially parallel with the bottom of each of the chute means.

Other important objects and novel features of the present invention will become obvious or be explained in greater detail, particularly when considering the accompanying drawings, wherein:

FIG. 3 is a horizontal, cross-sectional view taken substantially on the line 3—3 of FIG. 2 and looking downwardly in the direction of the arrows, certain components of the apparatus being broken away to reveal details of construction thereunder, with other parts thereof thereby being shown in cross-secton;

FIG. 4 is a vertical, cross-sectional view through one of the agitator arms and taken on the line 4—4 of FIG. 3;

FIG. 5 is a fragmentary, horizontal, cross-sectional view on the line 5—5 of FIG. 2; and FIG. 6 is another vertical, cross-sectional view through an agitator arm of the apparatus and taken on the line 6—6 of FIG. 5.

Figure 1:
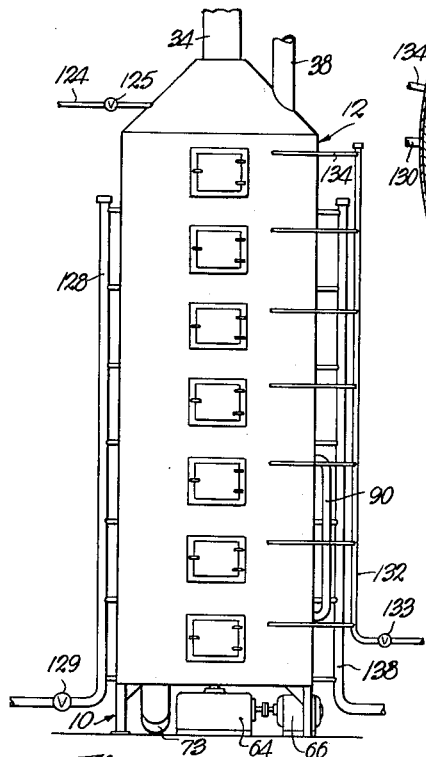
FIGURE 1 is a side elevational view of apparatus embodying the concepts of the present invention.

Apparatus embodying the preferred concepts of the present invention is denominated broadly by the numeral 10 in the drawings, and includes a hollow, cylindrical shell 12 formed of a pair of spaced, coaxial, cylindrical side walls 14 and 16 having a layer 18 of insulation therebetween and supported at the lower end thereof by a plurality of vertical legs 20. Frusto-conical shell 22, integral with the uppermost end of shell 12, includes a pair of spaced, conical top walls 24 and 26 joined to the upper margins of walls 14 and 16 respectively and also separated by a conical layer 28 of insulating material. Annulus 30 closes the upper end of shell 22 and presents a circular opening 32. Vapor outlet pipe 34 coupled to shell 22 in alignment with opening 32, is thereby disposed substantially on the axis of shell 12 and is connected to means for removing the solvent from water vapor which is conveyed from the interior of apparatus 10 to the condensing structure. It is also to be noted that shell 22 has an opening 36 therein receiving an upright, extracted flake inlet conduit 38 which is coupled to the extraction apparatus forming no part of the present invention.

Figure 2:
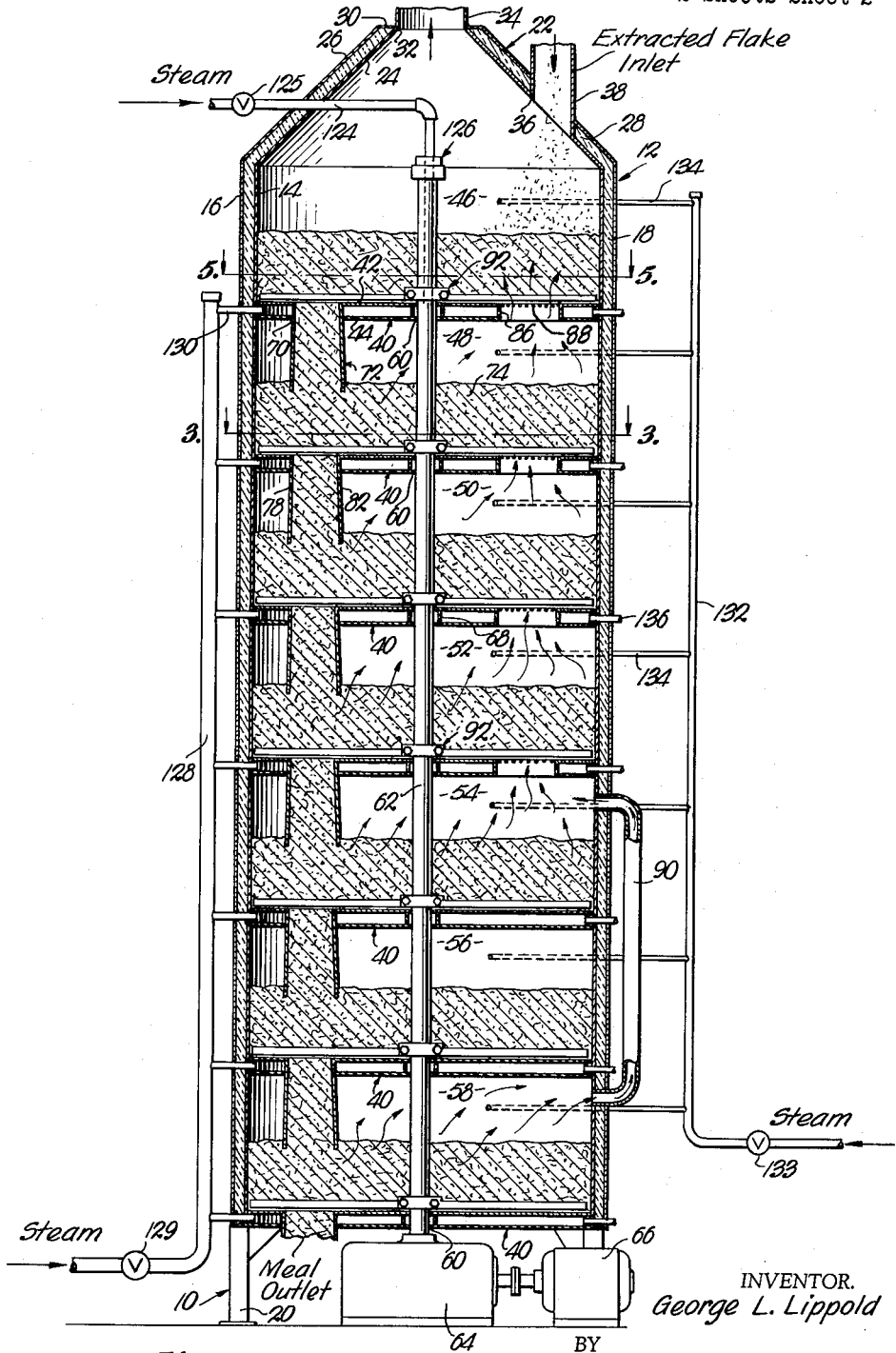
FIG. 2 is a vertical, cross-sectional view of the apparatus shown in FIG. 1 and greatly enlarged to illustrate details thereof.

Shell 12 is provided with a plurality of transversely extending, horizontal wall structures 40, each comprising an upper annular plate 42 and a lower annular plate 44 presenting a space therebetween. As best shown in FIG. 2, wall structures 40 divide shell 12 into individual compartments 46, 48, 50, 52, 54, 56 and 58. The axially aligned central openings 60 in plates 42 and 44 of each of the wall structures 40 rotatably receive vertically disposed shaft 62 which extends through the bottom wall structure 40 and is coupled to gear reducer 64 for rotation thereby. An electric motor 66 is operably connected to gear reducer 64 in order to drive shaft 62 at a predetermined rate.

It is to be preferred that each of the wall structures 40 have a cylindrical collar 68 between walls 42 and 44 thereof in surrounding relationship to shaft 62 in order to permit introduction of steam into wall structures 40 without leakage of the same through openings 60.

Plates 42 and 44 of each of the wall structures 40 also have aligned, substantially rectangular openings 70 therein which receive rectangular discharge chutes 72 which are disposed with the upper margins thereof in flush relationship with the upper surface of respective plates 42, while the lower rectangular extremities of all but the lowermost of the chutes 72 are disposed in predetermined spaced relationship to the proximal surface of an opposed plate 42, as is best shown in FIG. 2. The lowermost chute 72 is joined to a dried flake outlet conduit 73. The length of each of the chutes 72 determines the level of the material 74 within each of the compartments 46 to 58 inclusive. It is to be noted that the area of the lower extremity of each chute 72 is greater than the area of the opposite end of each corresponding chute to preclude bridging of material 74 therein. Chutes 72 are of longer length than width and disposed with the longitudinal axis thereof substantially radial with respect to the axis of shell 12. The wall 76 of each of the chutes 72 is disposed in a substantially vertical position, while the remaining walls 78, 80 and 82 flare outwardly from the upper rectangular margin of respective chutes 72, as best shown in FIG. 2, to thereby present a larger opening at the lower end of each chute than at the top part thereof as indicated above.

Certain of the plates 42 and 44 of wall structures 40 are also provided with three rectangular, radially positioned openings 84 therein with rectangular members 86 bridging aligned openings between opposed plates 42 and 44 of each wall structure 40 defining vapor passages intercommunicating compartments 46, 48, 50, 52 and 54. A number of parallel rods 88 bridging members 86 across the narrow width thereof and in parallelism with plates 42, preclude substantial amounts of flaky material 74 gravitating through the vapor passages defined by members 86 into the compartment therebelow.

The wall structures 40 presenting the lower part of compartments 54, 56 and 58 do not have vapor passages therein but compartments 54 and 58 are brought into intercommunication by a by-pass pipe 90 extending through shell 12 and communicating with respective compartments 54 and 58 above a horizontal plane through the lower margin of respective chutes 72 and thereby above the upper level of material 74 in the defined compartments.

Means for agitating material 74 within each of the compartments 46–58 comprises blade units 92 coupled to shaft 62 for rotation therewith, with a blade unit 92 being disposed directly above each of the wall structures 40 and considerably below the lower margin of each of the chutes 72. Blade units 92 each include a pair of identical blade members 94 and 96 having a block section 98 and a sweep 100, with opposed blocks 98 having semi-cylindrical grooves 102 therein adapted to complementally receive shaft 62 between opposed blocks 98 which are maintained in clamping engagement with the outer surface of shaft 62 by bolt and nut means 104 extending through both of the block sections 98 of each blade unit 92, as best shown in FIGS. 3 and 5. A key 106, carried by shaft 62 in alignment with each of the blade units 92, is complementally received within a groove 108 in the block section 98 of blade member 94 to thereby preclude rotation of shaft 62 relative to each of the blade units 92. The sweeps 100 are of sufficient length to cause the outer extremities thereof to be disposed in relatively close proximity to the inner surface of side wall 14, to thereby assure thorough agitation of the material 74 within compartments 46–58. Movement of sweeps 100 through material 74 is aided by the transverse configuration of the blades as shown in FIG. 4, wherein it can be seen that the angular leading surface 110 of each of the sweeps 100 lowers the resistance between the forward edge 112 of each sweep 100 and the material 74 during rotation of blade units 92 by shaft 62.

The uppermost blade unit 92 differs from the remaining blade units in that the sweeps 100 thereof have longitudinally extending passages 114 therein which communicate with laterally extending passages 116 terminating at the rear edge 118 of each sweep 100, it being noted from FIG. 6 that passages 116 and 114 lie in a common horizontal plane. Block sections 98 of the upper blade unit 92 are also provided with passages 120 therein which are aligned with openings 122 in the uppermost end of shaft 62 which is tubular in configuration, as indicated in FIGS. 2 and 5.

A steam pipe 124 having a valve 125 therein and extending through shell 22 is connected to the upper open end of the tubular part of shaft 62 by a coupling 126 which permits shaft 62 to rotate relative to steam pipe 124 without leakage of steam therefrom.

Steam pipe 128 having a valve 129 therein is connected to each of the wall structures 40 by header conduits 130 extending through shell 12 and into the space between opposed plates 42 and 44 of each of the wall structures 40 as indicated in FIGS. 2 and 3.

Another steam pipe 132 having a valve 133 therein communicates with the interior of each of the compartments 46 to 58 inclusive by header conduits 134 extending through shell 12 and into the interior of each of the compartments 46 to 58 above the normal level of material 74 therein. Condensate is removed from each of the wall structures 40 by pipes 136 disposed in opposed relationship to respective header conduits 130 and in turn connected in parallel relationship to a drain conduit 138.

In utilization of apparatus 10 to carry out the present invention, valves 129 and 125 are opened to permit steam to pass through pipes 128 and 124 respectively and thereby into the interior of each of the wall structures 40 through header conduits 130 and into the upper tubular end of shaft 62 for conveyance into the interior of compartment 46 via passages 120, 114 and 116. Liquid formed between each of the wall structures 40 and caused by condensation of the steam, passes out through pipes 136 and drain conduit 138 and preferably to the boiler of apparatus 10 (not shown) to thereby minimize losses of water during operation of the equipment.

Solvent extracted material such as soy bean flakes are directed into compartment 46 through conduit 38 and collect on the upper surface of plate 42 of the uppermost wall structure 40 defining the bottom of compartment 46. Upon introduction of material 74 into compartment 46, motor 66 is actuated to cause shaft 62 to be rotated in a counterclockwise direction and to thereby cause all of the blade units 92 to be rotated within respective compartments 46 to 58. The steam introduced into wall structure 40 forming the bottom of compartment 46 maintains the material therein at a specified temperature which will be defined hereinafter. It is to be recognized that the temperature to which material 74 is subjected within compartments 46–58 should be varied for different products to produce the most palatable and nutritious meal.

Steam is directed against the flakes within compartment 46 as the upper blade unit 92 is rotated by shaft 62, and it has been found that the quantity of steam introduced into compartment 46 should be correlated with the rate of flaked material 74 passing into compartment 46, with best results being obtained if the moisture content of material 74 is raised to a range of 14% to 30% or higher and particularly within a range of 15% to 20% with the latter percentage producing the best results when extracted soy beans are being processed.

The incoming steam is effective in removing the hexane solvent from the flakes, with such solvent passing upwardly through pipe 34 and with the steam then condensing on the flakes to raise the moisture content to the stipulated value, and which has been found necessary to produce a nutritious and palatable product during solvent removal and toasting of the flaked material.

As material 74 is agitated within compartment 46, a part of the same falls through the upper chute 72 into compartment 48 whereupon the material is subjected to the heated wall structure 40 forming the lower part of compartment 48 which serves to either raise the temperature of the flaked material to a higher figure or maintain the product at substantially the same temperature as that of the product at the time of delivery thereof into compartment 48. The solvent remaining in the material 74 directed into compartment 48 is volatilized and passes upwardly into compartment 46 through passages defined by members 86 in the uppermost wall structure 40. In this manner, the material 74 passes successively through compartments 46 to 58 and at a uniform rate, regardless of the quantity of material which is directed into shell 12 through conduit 38 per unit of time.

In compartment 46, the steam introduced thereinto causes substantially all of the solvent to be displaced from the flakes and conveyed from compartment 46 through conduit 34 and with the moisture content of the material being raised to a selected value. Raising of the temperature of the flakes in compartment 48 to the same or preferably a somewhat higher level removes substantially all of the small remaining amount of solvent in the flakes, while final desolventizing is effected within compartment 50. The material in compartment 52 is tempered for toasting of the flakes, bringing the latter up to a predetermined heat for deodorizing the same and thereby sufficient to remove volatile oils and other unwanted materials. The heat in this compartment deadens the phosphatides and waxes, with some moisture remaining in the material but completely devoid of the hexane solvent. The flakes are subjected to the initial toasting temperature in compartment 54, with this compartment being vented to compartment 52 through the vapor passages in the wall structure 40 therebetween in order to permit some moisture in the form of water vapor to be removed and thereby permitting initial toasting of the flakes.

When the material 74 passes into compartment 56, final toasting of the same takes place therein by virtue of the fact that this chamber is not vented to the chamber thereabove and thus, the material is subjected to a higher temperature as well as greater pressure of the order of 6 to 8 in. Hg to produce a nutritious and palatable meal by virtue of heating of the soy bean meal in the presence of a limited amount of moisture.

The toasted meal 74 then gravitates into lower compartment 58 where the product is substantially dried before passing outwardly of shell 12 through meal outlet chute 72 and conduit 73. The moisture removed from the meal 74 within compartment 58 is returned to compartment 54 through by-pass pipe 90 which thereby maintains the moisture content of the material 74 within compartment 54 at the proper level for beginning of the toasting operation. The utilization of a substantially closed chamber such as 56, wherein the toasting of the flakes is effected, has been found to be important in erasing the urease activity of the soy bean flakes while at the same time, producing a much more palatable and nutritious product, notwithstanding heating of the same to a somewhat higher temperature than heretofore employed.

Although only one valve 129 has been shown in pipe 128, it is to be understood that it is preferred to provide individual valves in header conduits 130 to permit selective variation of the amount of steam permitted to pass into respective wall structures 40. In this manner, the temperature within each of the compartments 46 to 58 may be effectively controlled to compensate for the rate of introduction of extracted flakes into the upper compartment 46.

The soy bean flakes introduced into compartment 46 through conduit 38 have a moisture content of approximately 12%, while the hexane constitutes about 35% by weight of the admixture. The moisture content of the flakes is then raised to the preferred level of about 20%, whereupon the material is passed successively through the compartments as described. During such passage, the material should preferably be maintained at a temperature above the vaporization point of hexane but below the boiling point of water. Thus, the steam introduced into wall structures 40 forming the bottom section of compartments 46, 48, 50 and 52, is preferably at a temperature of about 450° F. with the amount of steam introduced into the compartments being controlled so that the material is raised to a temperature of approximately 200° F. and then maintained at such point or permitted to rise slightly above that value in compartments 48–54. However, because of the closed nature of compartment 56, the temperature of the material therein is raised to approximately 250° F. to effect the required toasting, while the temperature of the material in compartment 58 is maintained at about 225° F. to effectively remove all of the moisture therefrom. In this respect, it can be seen that by-pass pipe 90 serves the important function of returning both heat and moisture to compartment 54 to begin initial toasting of the flakes without in any way disturbing the pressurized heating taking place within compartment 56. The moisture content of the material or meal 74 emerging from compartment 58 is approximately 17% and thus the meal is preferably conveyed to suitable drying apparatus prior to packaging of the product.

In the event that the material 74 should catch on fire within any of the compartments 46 to 58, the flames may be quickly smothered by introducing steam into the respective compartment through pipe 132 and header conduits 134 communicating with the interior of corresponding compartments above the normal level of the material 74. In this respect, it is also to be understood that individual valves may be provided in header conduits 134 to permit introduction of steam into any one or all of the compartments of apparatus 10.

Having thus described the invention what is claimed as new and desired to be secured by Letters Patent is:

1. A continuous method of desolventizing and toasting soybean meal that has been extracted with a solvent having a boiling point below that of water, said method comprising the steps of:
 (a) introducing the meal into the uppermost of a series of stacked compartments in direct intercommunication through a series of passages therebetween;
 (b) passing the meal successively through the compartments in a continuous stream via said passages and in flow configuration defining meal-free areas in each compartment above the level of the meal therein;
 (c) heating the meal with steam in said uppermost compartment to a first temperature above the volatilization temperature of the solvent but below the boiling point of water;
 (d) raising the water content of the meal in said uppermost compartment to a level within the range of about 14 percent to approximately 30 percent;
 (e) removing solvent vapor from said area of the uppermost compartment, the meal being maintained in said uppermost compartment for a period sufficient to effect removal of a substantial proportion of the solvent therefrom;
 (f) maintaining the meal in a second compartment below said uppermost compartment substantially at said first temperature, the meal passing through said second compartment being maintained therein for a period sufficient to effect substantial destruction of the urease activity thereof;
 (g) providing vapor communication between said area of the second compartment and the first compartment;
 (h) heating the meal in a third compartment below said second compartment to a second temperature above said first temperature sufficient to effect toasting of the meal without burning thereof;
 (i) maintaining the temperature of the meal in a fourth compartment below said third compartment at a level to dry the meal without burning thereof;
 (j) providing vapor communication between the second and fourth compartments in by-passing relationship to said third compartment, the pressure on the meal in said third compartment being maintained at a level above the pressure in the other compartments to enhance toasting of the meal but below a pressure sufficient to cause blow-back of meal from the third compartment; and (k) discharging desolventized and toasted meal from said fourth compartment.

2. A method as set forth in claim 1 wherein the pressure in said third compartment is maintained at a level of the order of 6–8 inches of mercury.

3. A method as set forth in claim 1 wherein said first temperature is about 200° F.

4. A method as set forth in claim 1 wherein said second temperature is about 250° F.

5. A method as set forth in claim 1 wherein the temperature of the meal in said fourth compartment is maintained at about 225° F.

References Cited in the file of this patent

UNITED STATES PATENTS

| | | |
|---|---|---|
| 1,212,643 | Hopewell | Jan. 16, 1917 |
| 1,946,923 | Wilcox | Feb. 13, 1934 |
| 2,260,254 | Kruse | Oct. 21, 1941 |
| 2,585,793 | Kruse | Feb. 12, 1952 |
| 2,593,401 | Adams | Apr. 22, 1952 |
| 2,695,459 | Hutchins | Nov. 30, 1954 |
| 2,776,894 | Kruse | Jan. 8, 1957 |
| 2,806,297 | Hutchins | Sept. 17, 1957 |